United States Patent Office 3,530,082
Patented Sept. 22, 1970

3,530,082
OIL-FREE LINEAR POLYESTER RESINS BASED ON PHTHALIC ACIDS, DIMER FATTY ACIDS, NEO-PENTYL GLYCOL, BETA-SUBSTITUTED DIOLS AND A BISPHENOL-BASED DIOL
Malachy T. O'Gorman and John D. Downs, Kankakee, Ill., assignors to Mobil Oil Corporation, a corporation of New York
No Drawing. Filed June 11, 1969, Ser. No. 832,487
Int. Cl. C08g 17/10; C09d 3/64
U.S. Cl. 260—22          15 Claims

ABSTRACT OF THE DISCLOSURE

Oil-free polyester resins are provided in which a mixture of a phthalic acid, such as isophthalic acid, and dimer fatty acids are formed into a polyester with dihydroxy compounds primarily constituted by a mixture of neopentyl glycol, beta-substituted diols such as 2,2-dimethyl - 3 - hydroxypropyl 2,2 - dimethyl - 3 - hydroxypropionate and a bisphenol-based diol such as 1,1'-isopropylidenebis(p-phenyleneoxy)di-2-propanol.

---

The present invention relates to oil-free linear polyester resins especially adapted for use as solution coatings in the coating of metal strip (coil coating) where toughness, flexibility and adhesion are at a premium because of the need to post form the coated metal. Tolerance of the polyester for aromatic solvents is also important in order to avoid the need to use more costly active solvents.

In accordance with the invention, a polyester is provided which consists essentially of phthalic acid, dimer fatty acid, and certain selected dihydroxy compounds. These dihydroxy compounds are primarily constituted by a mixture of neopentyl glycol, a diol in which the carbon atom or atoms beta to both of the hydroxy groups are lower alkyl substituted, and a bisphenol-based diol.

A first essential component of the polyesters of the invention is a phthalic acid. Thus, one may use phthalic acid or anhydride, isophthalic acid, terephthalic acid and derivatives thereof such as halogenated derivatives illustrated by hexachlorophthalic acid or anhydride or endomethylene tetrahydrophthalic acid or anhydride. Isophthalic acid, either alone or in admixture with minor proportions of the other phthalic acids, is preferred.

A second essential component is dimer fatty acid, a term which generically denotes dimers of unsaturated aliphatic monocarboxylic acids containing from 14 to 22 carbon atoms. These dimer acids are dicarboxylic aliphatic acids and are commercially available from the dimerization of acids illustrated by palmitic, oleic, linoleic, linolenic, ricinoleic and like acids or mixtures thereof. This class of materials is well known and is typified by the dimer of linoleic acid which will be used herein as illustrative.

The third essential component is a diol component primarily constituted by specific mixtures of neopentyl glycol and diol in which the carbon atom or atoms beta to both of the hydroxy groups are lower alkyl substituted. Neopentyl glycol is a specific compound containing a single tertiary carbon atom and the invention requires the selection of this specific compound. On the other hand, the diol which is used in admixture with the neopentyl glycol is also important and is subject to variation within a relatively narrow area.

Referring more particularly to the diol component, the preferred diol in accordance with the invention is the ester diol 2,2-dimethyl-3-hydroxypropyl 2,2-dimethyl-3-hydroxypropionate which has the formula:

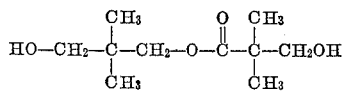

As can be seen, the ester diol noted above includes two positions beta to each of the two hydroxy groups, providing a total of four beta positions, all of which are methyl substituted.

Another diol of the type contemplated by the invention is the compound 2-methyl-2-ethyl 1,3-propane diol. Here, a single carbon atom is positioned beta to each of the hydroxy groups and it is methyl and ethyl substituted. The term lower alkyl as used herein is intended to refer to an alkyl group containing from 1–4 carbon atoms, with the methyl group being most preferred and the ethyl group being secondarily preferred.

Still another diol of the type defined by the invention is the compound 2,2,4-trimethyl 1,3-pentane diol. Here, there are two carbon atoms beta to the hydroxy groups and one of these is dimethyl substituted with the other being monomethyl substituted.

Accordingly, the dihydroxy compound component is primarily constituted by neopentyl glycol and the above defined beta-substituted diol component with any balance of the dihydroxy compound component being preferably limited to not more than about 25% of the total dihydroxy compound component.

However, and in addition to the neopentyl glycol and the beta-substituted diol, the polyester must contain from 3–10%, preferably from 4–8%, based on total solids, of a bisphenol-based diol illustrated by 1,1'-isopropylidene-bis(p - phenyleneoxy)di-2-propanol. The bisphenol structure is well known and is constituted by a pair of phenolic groups attached through an intervening divalent alkylene group and the hydroxy groups which provide the diol structure are secured to the phenolic groups in the form of alkylene ethers.

Proportions are also important to the invention as will now be discussed. Thus, the total dicarboxylic acid content should be in the range of from 50–65% by weight, preferably from 53–60%, these acids being essentially constituted by the phthalic acid and dimer fatty acid to which only small amounts of other acids, such as maleic acid, can be added. These acids should be used in a weight ratio of phthalic acid to dimer fatty acid of from 1:0.4 to 1:0.8, preferably from 1:0.55 to 1:0.65.

The balance of the polyester consists essentially of dihydric alcohol with the weight ratio of neopentyl glycol to beta-substituted diol being from 2.5:1 to 1:1.5, preferably from 1.5:1 to 1:1.

A portion of the dihydroxy compound component may be constituted by conventional diols such as ethylene glycol, propylene glycol, butylene glycol, 1,5-pentane diol, 1,6-hexane diol, diethylene glycol, dipropylene glycol and other similar diols. The point to be observed is that while these diols may be present and are economical to use, they do not provide the toughness, flexibility and aromatic solvent tolerance needed in the invention in the absence of the specific combination of dihydric compounds which is the discovery on which the present invention is based.

The invention is directed towards essentially linear polyesters, and polyhydroxy compounds containing more than two hydroxy groups per molecule reduce the desired linearity and are therefore preferably absent. On the other hand, some loss of linearity may be tolerated and, in this light, up to 10% and less desirably up to 15% of the weight of the hydroxy-functional components may be composed of polyhydroxy compounds containing more than two hydroxy groups per molecule, such as glycerin or pentaerythritol.

Similarly, the acids which are used in the invention should be dicarboxylic acids, with one or more of the phthalic acids constituting the bulk of the acid component with the exception of the dimer fatty acid referred to. On the other hand, small amounts of other dicarboxylic acids may be used and for specialized purpose are desirably present. Thus, from 1-4%, based on the total weight of the polyester, of unsaturated acid, such as maleic or fumaric acid is desirably present. These dicarboxylic acids may be supplied in the form of the anhydride, e.g., maleic anhydride.

The invention is illustrated in the following example.

EXAMPLE 1

An oil-free, linear polyester resin adapted for use in the coating of metal strip is prepared from the following components.

| Component: | Parts by weight |
|---|---|
| Dimer acid (Note 1) | 19.87 |
| 2,2-dimethyl-3-hydroxypropyl 2,2 - dimethyl-3-hydroxypropionate | 18.72 |
| Neopentyl glycol | 20.21 |
| Technical grade of 1,1'-isopropylidenebis(p-phenyleneoxy)di-2-propanol | 5.67 |
| Maleic anhydride (viscosity control agent) | 1.41 |
| Isophthalic acid | 34.12 |
| | 100.00 |

*Procedure for preparation.*—Charge all of the foregoing components, except the isophthalic acid, into a reactor equipped with a condenser and separator and heat to 125° C. The isophthalic acid is then added, and the temperature is raised to 250° C. A small amount of water starts to evolve when the temperature reaches 175° C. When the temperature levels off at 250° C., a small amount of azeotroping agent is added to help the removal of water (2% of xylene based on solids charged). The temperature is held at 250° C. for about four and one-half hours to lower the acid number to a value of less than 10 and to provide a Gardner-Holdt viscosity of U. The resin so-provided is thinned to 60% solids in a commercial mixture of aromatic hydrocarbon solvents having a boiling range of from 375–410° F.

Note 1

The dimer acid utilized is the dimer of linoleic acid and has the following characteristics:

Neutralization equivalent—285–297
Acid value—189–197
Saponification value—191–199
Monobasic acid content—2–5% (by distillation to 270° C. at 2 mm. Hg abs.)
Pour point—35° F.
Flash point—530° F.
Fire point—600° F.
Gardner-Holdt viscosity at 25° C.—Z-4

The 60% nonvolatile polyester resin solution produced in Example 1 is mixed with hexamethoxymethyl melamine to provide a solution containing 85/15 resin/melamine on a nonvolatile basis. To this solution is added 0.7% based on total solids, of an acid catalyst (paratoluene sulfonic acid).

The clear coating so-provided is applied to .021" cold rolled steel panels and cured for 1 minute at 500° F. After cooling the coated panels are subjected to the various tests noted below.

*Wedge-bend flexibility.*—The panels are bent into a U-shape and placed under the hinge of the tester which slopes downward from ⅛" to 0" and pressed. This results in a wedge-bend sloping from 0" to ⅛" over a distance of 100 mm. Scotch tape is then applied to the wedge and removed quickly. Cracking or removal of the film is measured in millimeters along the bend from 0" toward the ⅛" and recorded as percent failure.

*Solvent tolerance.*—5 grams of the resin solution are weighed into a beaker, and an aromatic hydrocarbon solvent having a boiling range of from 375–410° F. is added until a haze develops. The results are recorded as milliliters of solvent to haze 5 grams of resin solution.

*Pencil hardness test.*—A set of pencils ranging from 6B (soft) to 6H (hard) are used, starting with the hard end of the set. These pencils are pushed in turn into the film. The first pencil which crumbles instead of penetrates indicates the pencil hardness.

The coated panels described above, when subjected to the above tests, provided the following results:

Wedge bend flexibility—0% failure
Solvent tolerance—Infinite
Pencil hardness—H

Efforts were made to duplicate the above results utilizing phthalic acid-dimer fatty acid-based polyester resins disclosed in the examples of U.S. Pat. 3,158,584 granted Nov. 24, 1964, but these efforts were unsuccessful. In every instance, the wedge bend flexibility of the coated panels revealed extensive failure (from 20–50% failure), and the aromatic hydrocarbon solvent tolerance was limited in that infinite dilution was not possible.

Not only do the coatings of the invention exhibit better flexibility and aromatic hydrocarbon solvent tolerance, but weatherometer data indicates that there is also a significant improvement in weather resistance.

The invention is defined in the claims which follow.

We claim:
1. An oil-free polyester resin consisting essentially of a phthalic acid component, dimer fatty acid, 3–10% by weight of bisphenol-based diol, and dihydroxy compound primarily constituted by a mixture of neopentyl glycol and a diol in which the carbon atom or atoms beta to each hydroxy group is lower alkyl substituted, the total dicarboxylic acid content of said polyester being from 50–65% by weight with the weight ratio of said phthalic acid to said dimer fatty acid being from 1:0.4 to 1.0.8, the weight ratio of said noepentyl glycol to said diol being from 2.5:1 to 1:1.5.

2. A polyester resin as recited in claim 1 in which said phthalic acid comprises isophthalic acid.

3. A polyester resin as recited in claim 1 in which the dicarboxylic acid content of said polyester is from 53–60%.

4. A polyester resin as recited in claim 3 in which the weight ratio of said phthalic acid to said dimer fatty acid is from 1:0.55 to 1:0.65.

5. A polyester resin as recited in claim 4 in which the weight ratio of said neopentyl glycol to said diol is from 1.5:1 to 1:1.

6. A polyester resin as recited in claim 1 in which said dimer fatty acid is the dimer of linoleic fatty acid.

7. A polyester resin as recited in claim 1 in which said diol is 2,2-dimethyl-3-hydroxypropyl 2,2-dimethyl-3-hydroxypropionate.

8. A polyester resin as recited in claim 1 in which said diol is 2-methyl-2-ethyl 1,3-propane diol.

9. A polyester resin as recited in claim 1 in which said diol is 2,2,4-trimethyl 1,3-petane diol.

10. A polyester resin as recited in claim 1 in which from 1–4% of maleic or fumaric acid is present.

11. A polyester resin as recited in claim 1 in which said bisphenol-based diol is 1,1'-isopropylidenebis(p-phenyleneoxy)di-2-propanol, and is present in an amount of from 4–8%.

12. An oil-free polyester resin consisting essentially of a phthalic acid 4–8% by weight of bisphenol-based diol, component comprising isophthalic acid, dimer fatty acid and dihydroxy compound consisting essentially of a mixture of neopentyl glycol and a diol selected from the group consisting of 2,2-dimethyl-3-hydroxypropyl 2,2-dimethyl-3-hydroxypropionate, 2-methyl-2-ethyl 1,3-propane diol, and 2,2,4-trimethyl 1,3-pentane diol, the total dicarboxylic acid content of said polyester being from 53–60% by weight with the weight ratio of said phthalic acid component to said dimer fatty acid being from 1:0.55 to 1:0.65, the weight ratio of said neopentyl glycol to said diol being from 1.5:1 to 1:1.

13. A poleyster resin as recited in claim 12 in which said polyester includes from 1–4% by weight of maleic or fumaric acids.

14. A polyester resin as recited in claim 12 in which said phthalic acid component consists of isophthalic acid.

15. A coating solution comprising aromatic hydrocarbon solvent having dissolved therein the oil-free linear polyester resin of claim 1.

References Cited
UNITED STATES PATENTS 3,158,584  11/1964  Layman _____ 260—22

DONALD E. CZAJA, Primary Examiner

R. W. GRIFFIN, Assistant Examiner

U.S. Cl. X.R.

117—132, 161; 260—21, 33.6

PO-1050
(5/69)

UNITED STATES PATENT OFFICE
CERTIFICATE OF CORRECTION

Patent No. 3,530,082     Dated September 22, 1970

Inventor(s) Malachy T. O'Gorman and John D. Downs

It is certified that error appears in the above-identified patent and that said Letters Patent are hereby corrected as shown below:

Column 4, line 73 (Claim 12), "a phthalic acid 4-8% by weight of bisphenol-based diol, component comprising isophthalic acid, dimer fatty acid and" should be read --a phthalic acid component comprising isophthalic acid, dimer fatty acid, 4-8% by weight of bisphenol-based diol and--.

SIGNED AND SEALED
DEC 22 1970

(SEAL)
Attest:

Edward M. Fletcher, Jr.
Attesting Officer

WILLIAM E. SCHUYLER, JR.
Commissioner of Patents